(12) United States Patent
Blattert et al.

(10) Patent No.: US 9,937,907 B2
(45) Date of Patent: Apr. 10, 2018

(54) PROVIDING A CLAMPING FORCE THAT IS GENERATED BY MEANS OF AN AUTOMATIC PARKING BRAKE FOR A VEHICLE

(71) Applicant: Robert Bosch GmbH, Stuttgart (DE)

(72) Inventors: Dieter Blattert, Kirchheim/Necckar (DE); Frank Baehrle-Miller, Schoenaich (DE)

(73) Assignee: Robert Bosch GmbH, Stuttgart (DE)

( * ) Notice: Subject to any disclaimer, the term of this patent is extended or adjusted under 35 U.S.C. 154(b) by 82 days.

(21) Appl. No.: 14/615,549

(22) Filed: Feb. 6, 2015

(65) Prior Publication Data

US 2015/0217739 A1  Aug. 6, 2015

(30) Foreign Application Priority Data

Feb. 6, 2014  (DE) .................. 10 2014 202 165

(51) Int. Cl.
| | |
|---|---|
| *B60T 8/172* | (2006.01) |
| *B60T 8/24* | (2006.01) |
| *B60T 8/88* | (2006.01) |
| *B60T 13/58* | (2006.01) |
| *B60T 13/74* | (2006.01) |
| *F16D 55/226* | (2006.01) |
| *F16D 121/24* | (2012.01) |
| *F16D 125/40* | (2012.01) |

(52) U.S. Cl.
CPC .............. *B60T 8/172* (2013.01); *B60T 8/245* (2013.01); *B60T 8/885* (2013.01); *B60T 13/588* (2013.01); *B60T 13/741* (2013.01); *F16D 55/226* (2013.01); *B60T 2270/406* (2013.01); *F16D 2121/24* (2013.01); *F16D 2125/40* (2013.01)

(58) Field of Classification Search
CPC ............ B60T 8/172; B60T 8/245; B60T 1/12; B60W 10/182
See application file for complete search history.

(56) References Cited

U.S. PATENT DOCUMENTS

| | | | | |
|---|---|---|---|---|
| 4,989,703 | A | * | 2/1991 | Forsyth .................. B60T 13/22 188/151 A |
| 6,659,236 | B1 | * | 12/2003 | Clark ...................... F16D 65/18 188/196 V |
| 8,220,877 | B2 | * | 7/2012 | Makishima ............... B60T 7/22 188/158 |
| 2003/0070888 | A1 | * | 4/2003 | Baumgartner ........ B60T 13/741 188/72.8 |

(Continued)

FOREIGN PATENT DOCUMENTS

DE    10 2011 005 842 A1    9/2012

*Primary Examiner* — Ryan Rink
(74) *Attorney, Agent, or Firm* — Maginot, Moore & Beck LLP

(57) ABSTRACT

A method for providing a clamping force that is generated with an automatic parking brake for a vehicle using a brake motor and a brake piston that acts upon a brake disk, includes building up a hydraulic pressure in a braking circuit of the vehicle after the automatic parking brake is applied. The method further includes determining a pressure loss gradient in the braking circuit of the vehicle. The method further includes performing or not performing a further application of the automatic parking brake based in part upon the determined pressure loss gradient.

10 Claims, 3 Drawing Sheets

(56) References Cited

U.S. PATENT DOCUMENTS

| | | | | |
|---|---|---|---|---|
| 2004/0113486 A1* | 6/2004 | Koga | ............ | B60T 7/107 |
| | | | | 303/20 |
| 2004/0212251 A1* | 10/2004 | Kinder | ............ | B60T 8/00 |
| | | | | 303/191 |
| 2004/0238299 A1* | 12/2004 | Ralea | ............ | B60T 7/085 |
| | | | | 188/156 |
| 2005/0127748 A1* | 6/2005 | Goto | ............ | B60T 13/04 |
| | | | | 303/89 |
| 2005/0167212 A1* | 8/2005 | Pascucci | ............ | B60T 7/107 |
| | | | | 188/72.2 |
| 2007/0084682 A1* | 4/2007 | Griffith | ............ | B60T 8/00 |
| | | | | 188/156 |
| 2007/0158142 A1* | 7/2007 | Hurwic | ............ | B60T 7/107 |
| | | | | 188/1.11 L |
| 2008/0264740 A1* | 10/2008 | Usui | ............ | F16D 65/18 |
| | | | | 188/73.31 |
| 2011/0272225 A1* | 11/2011 | Febrer | ............ | B60T 7/12 |
| | | | | 188/106 P |
| 2013/0226426 A1* | 8/2013 | Baehrle-Miller | ............ | B60T 13/588 |
| | | | | 701/70 |
| 2014/0102558 A1* | 4/2014 | Call | ............ | B60T 17/04 |
| | | | | 137/505 |
| 2014/0110197 A1* | 4/2014 | Burgoon | ............ | B60T 1/065 |
| | | | | 188/72.4 |
| 2016/0107623 A1* | 4/2016 | No | ............ | B60T 17/22 |
| | | | | 701/70 |

\* cited by examiner even to provide that is generated by means of an automatic parking brake for a vehicle.

PROVIDING A CLAMPING FORCE THAT IS GENERATED BY MEANS OF AN AUTOMATIC PARKING BRAKE FOR A VEHICLE

This application claims priority under 35 U.S.C. § 119 to patent application no. DE 10 2014 202 165.0 filed on Feb. 6, 2014 in Germany, the disclosure of which is incorporated herein by reference in its entirety.

The disclosure relates to a method for providing a clamping force that is generated by means of an automatic parking brake, to an open-loop or closed-loop control device and to an automatic parking brake for a vehicle.

BACKGROUND

DE 10 2011 005 842 A1 discloses an automatic parking brake for use in a vehicle, said parking brake can exert a clamping force on a brake disk so as to secure a stationary vehicle. The clamping force is generated by means of a spindle nut and a brake piston that are displaced by means of a brake motor and grip the brake disk between two brake pads during an application of said parking brake. In addition, the brake piston can be influenced by means of a hydraulic brake fluid which is achieved by means of the regular vehicle brake (service brake). As a result of braking procedures that are performed whilst travelling it is possible for the brake disk to become warm or rather hot. As a consequence, during the procedure of securing the stationary vehicle by means of the parking brake, the problem arises that the increased temperature changes the coefficient of friction and the expansion of the brake disk.

If the brake disk cools down after an application of the automatic parking brake, a loss of clamping force can result. Generally, a further application of the automatic parking brake is therefore initiated sometime after the initial application and said further application of the automatic parking brake is calculated and performed on the basis of the brake disk temperature. If the determined brake disk temperature exceeds a determined value, it is assumed that the loss of clamping force experienced by the automatic parking brake is not negligible if the brake disk has cooled down after some time. Consequently, a further application of the parking brake is performed that is intended to compensate for the loss of clamping force. If on the other hand the brake disk temperature is less than the predetermined temperature value, then a further application of the automatic parking brake is not performed because the function of the automatic parking brake is not expected to be impaired.

However, the above described, exclusively "temperature-based" parking brake system has the disadvantage that, despite the further application of the automatic parking brake, a part of the clamping force can be lost if a thermal relaxation occurs. This is in particular the case if long braking maneuvers or multiple intense braking maneuvers are performed immediately prior to the application of the parking brake. The braking maneuvers cause in particular the brake disk and the brake pads to heat up and expand. During the subsequent cooling process and in the case of simultaneously locked parking brakes, the components "shrink" causing a part of the clamping force to be lost. The brake disk temperature model (BTM) provides in this case merely a starting point with respect to the temperature of the brake disks. The BTM is not precise particularly as a result of the changed flow behavior (e.g. by means of a spoiler or hub caps), the material (steel or aluminum rims) and also the environmental conditions. Depending upon the configuration, "estimation errors" of 50° C. to 100° C. are possible.

Conventional brake systems frequently further apply the automatic parking brake without taking into account how much it is necessary to further apply the automatic parking brake or rather when it is the optimum time for further applying said parking brake. Under certain circumstances, the automatic parking brake is even further applied on a number of occasions which necessarily leads to the open-loop control device running on for a long period of time and consequently increases the loading on the components since the electric brake motor together with the gear mechanism must run on more than one occasion against a pre-stressed system.

SUMMARY

The object of the present disclosure is therefore to provide a method that ensures a reliable function of the automatic parking brake even in the case of a loss of clamping force that occurs as a result of a change in temperature in the brake disk and that furthermore minimizes a loading of the components of the automatic parking brakes.

The object is achieved by virtue of the features of the independent claims. Further developments of the disclosure are disclosed in the subordinate claims.

In accordance with a first embodiment of the disclosure, a method is provided for providing a clamping force that is generated by means of an automatic parking brake for a vehicle, wherein the clamping force is generated by means of a brake motor and a brake piston that acts on a brake disk. Following a completed application of the automatic parking brake, a hydraulic pressure is built up in a braking circuit of the vehicle and a pressure loss gradient is determined in the braking circuit of the vehicle, wherein a further application of the automatic parking brake is performed or not performed in dependence upon the determined pressure loss gradient. In order to facilitate understanding, the term 'pressure loss gradient (dp/dt)' is used and this is naturally also intended to mean a value that represents the pressure loss gradient (dp/dt).

As a result of the system in accordance with the disclosure, a preventative further application of the parking brake(s) is not necessary. The loss of pressure in the braking circuit of the vehicle reliably indicates how the clamping force of the automatic parking brake is developing as a result of the thermal relaxation. In addition, the run-on time of the open-loop control device is minimized and the loading on the components of the brake system is reduced. Even extremely stiff brake systems are consequently easier to operate, the loading on the components in extremely stiff brake systems being particularly high. Such a high degree of rigidity is particularly desired so that the service brake behavior is supported (smaller volume taken up) and also the residual braking torque can be reduced. The brake piston can be drawn back by way of example by means of a sealing ring and in the case of a more rigid system, this procedure produces an improved "free movement" in comparison with a softer system.

A further application of the automatic parking brake is advantageously performed in dependence upon the determined pressure loss gradient if a predetermined threshold value for the pressure loss gradient is exceeded. In this manner, it can be defined exactly which loss of clamping force still lies within the tolerance region and which does not.

The total loss of clamping force at the automatic parking brake that is to be expected is advantageously determined by means of the value of the pressure loss gradients (dp/dt) and compensated for by means of further applying said parking brake. In this manner, the originally defined clamping force is reliably adjusted.

The pressure loss gradient can be determined at the brakes of a rear axle of the vehicle, however it is also possible to determine the pressure loss gradient at the brakes of a front axle of the vehicle in order thereby to determine the total loss of clamping force that is to be expected at the rear axle of the vehicle. This has the advantage that since the brake pistons of the front axle are not mechanically locked by means of a parking brake, in this case it is possible to work with clearly smaller forces which leads to a reduction of loading on the components.

The angle of inclination of the vehicle is advantageously determined, wherein the further application of the automatic parking brake is performed in dependence upon the angle of inclination of the vehicle. As a consequence, superfluous further applications of the automatic parking brake are avoided if the vehicle stands by way of example on flat ground and consequently even a reduced clamping force suffices in order to reliably secure the vehicle.

Advantageously, the loss of clamping force at the automatic parking brake is monitored in addition by means of force measuring technology, whereby a further application of the automatic parking brake can be performed to a more precise degree.

In addition, a closed-loop or open-loop control device is provided for performing the method in accordance with the disclosure and also an automatic parking brake is provided for a vehicle.

BRIEF DESCRIPTION OF THE DRAWINGS

Further features and expedient features of the disclosure are evident in the description of exemplary embodiments with reference to the attached figures. In the figures.

DETAILED DESCRIPTION

Figure 1:
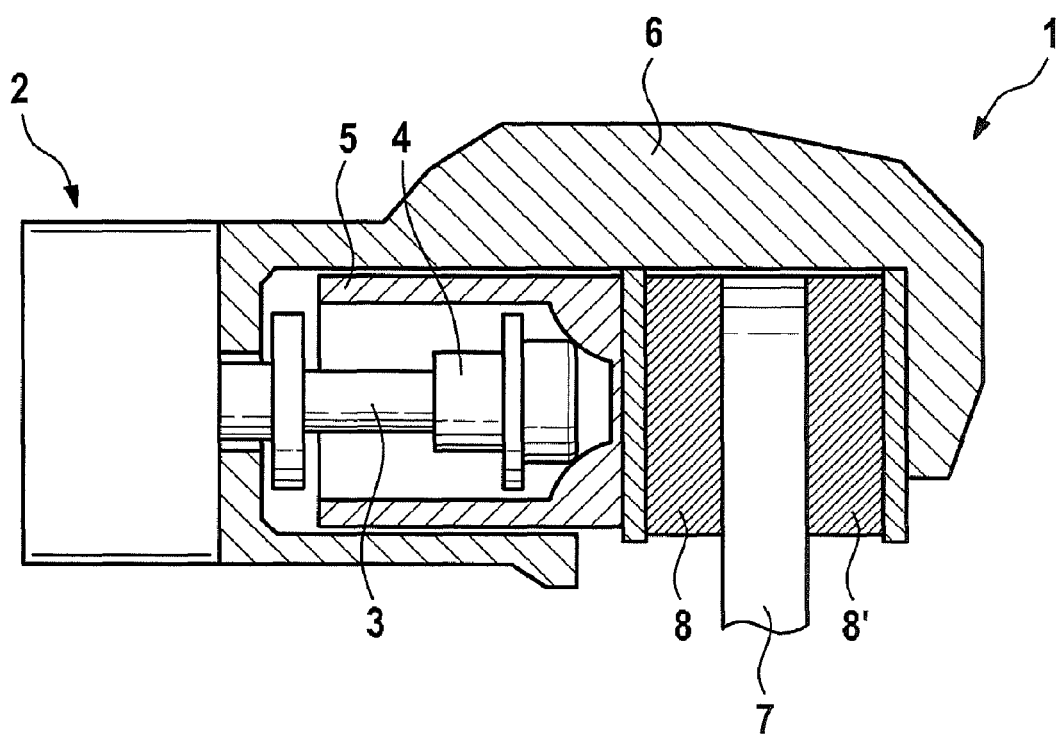
FIG. 1 illustrates a sectional view of a conventional automatic parking brake for a vehicle.

FIG. 1 illustrates a sectional view through a known automatic (automated) parking brake (securing brake) 1 for a vehicle and said parking brake can exert a clamping force by means of a brake motor 2 so as to secure the vehicle. The brake motor 2 is in this case embodied as an electric motor that drives a spindle 3, in particular a threaded spindle, which is mounted in an axial direction. The spindle 3 is provided with a spindle nut 4 on its end that is remote from the brake motor 2 and said spindle nut lies against an inner front end face or a rear face of a brake piston 5. The spindle 3, the spindle nut 4 and the brake piston 5 are mounted in a brake caliper 6 that overlaps a brake disk 7 in a pincer-like manner. A brake pad 8, 8' is arranged in each case on both sides of the brake disk 7.

During an application of the parking brake 1, the spindle nut 4 is moved by means of rotating the spindle 3 in an axial direction towards the brake piston 5 and the brake disk 7 until a predetermined desired clamping force is achieved. In addition to the electromechanical clamping force, the rear face of the brake piston 5 can be influenced by means of a hydraulic fluid that disengages the automatic parking brake and/or triggers a braking procedure in the normal driving operation of the vehicle (service brake).

Figure 2:
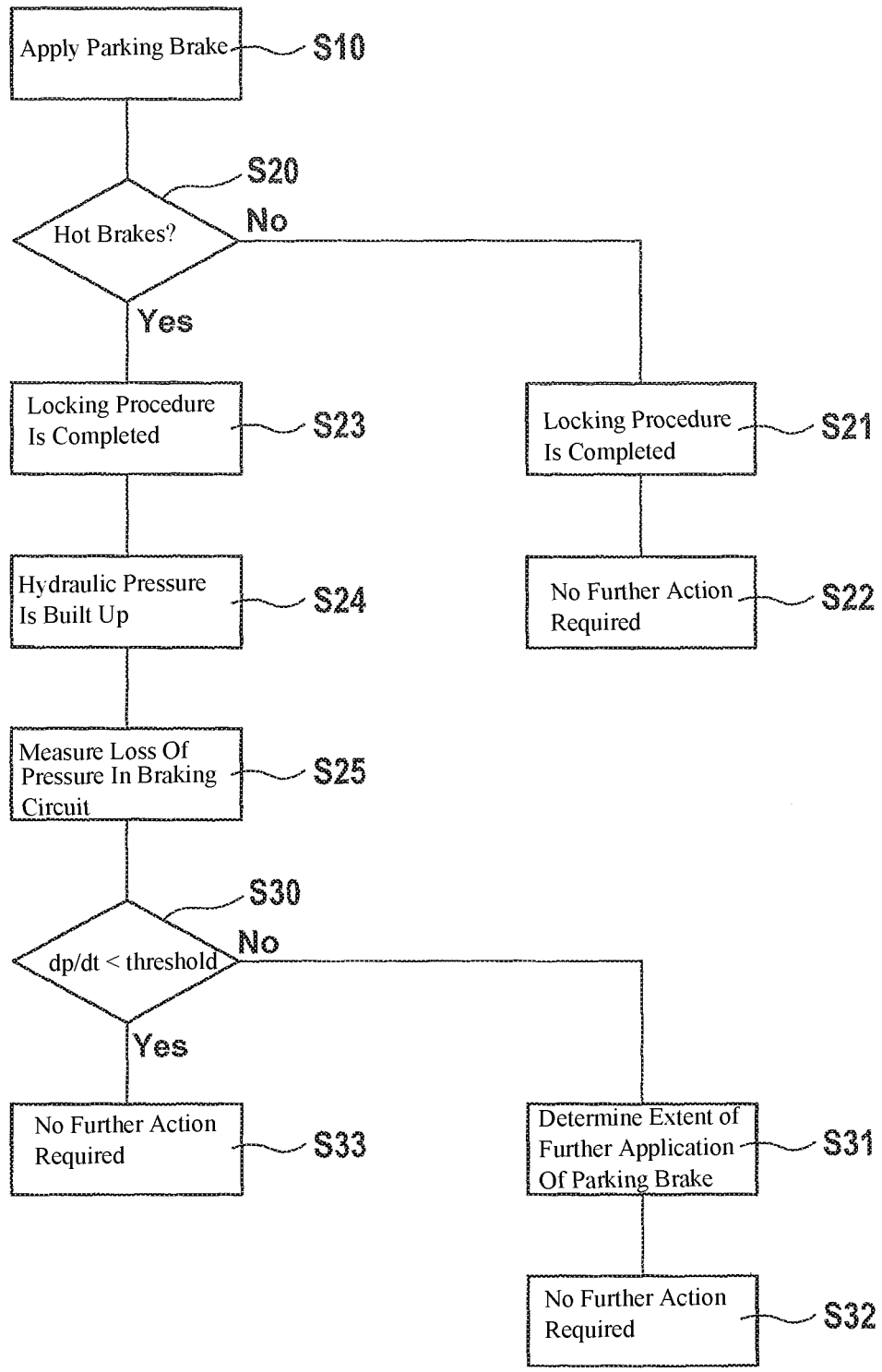
FIG. 2 illustrates a flow diagram of a method for providing a clamping force that is generated by means of the automatic parking brake and that secures the vehicle in accordance with one embodiment of the disclosure.

FIG. 2 illustrates a flow diagram of a method for providing a clamping force that is generated by means of an automatic parking brake 1 and secures a vehicle. The method ensures a strategy of further applying the automatic parking brake with a reduced loading on the components which ensures that the vehicle is reliably secured even in the case of a loss of clamping pressure as a result of thermal relaxation of the affected components.

In accordance with a first embodiment of the disclosure, initially a locking procedure of the parking brake 1 is performed (S10). The result of the BTM is evaluated while performing the locking procedure. In a next step, a decision regarding "hot brakes" or "cold brakes" (S20) is made in dependence upon the result of the BTM. In the case of cold brakes (No or N-path), the locking procedure is completed (S21), further actions are not necessary at this point (S22). In the case of hot brakes (Yes or Y-path), the locking procedure is likewise completed (S23) but hydraulic pressure is built up (S24) after completing the procedure of controlling the locking procedure. This build-up of pressure is only performed at the rear axle of the vehicle which means it is only necessary to displace a minimal volume since the brake system is already mechanically pre-stressed by means of the parking brake 1, whereby the control time of the corresponding hydraulic pumps is very brief. Alternatively, the hydraulic pressure can also be provided by means of an ESP system or for example by means of an iBooster. An arrangement that provides mechanical-hydraulic pressure is also feasible.

If BTM is not provided, the build-up of hydraulic pressure (S24) is generally performed after the procedure of locking the parking brake 1.

The loss of pressure in the braking circuit is subsequently measured (S25) and a pressure loss gradient (pressure drop gradient) dp/dt is determined. The system is either entirely sealed (no valve leakages), whereby the loss of pressure is correlated with the loss of clamping force. Alternatively, the leakage is minimal, as a result of which pressure is lost as in the case of thermal relaxation. Furthermore, the pressure loss gradient dp/dt is evaluated (S30) or is compared with a threshold value. If the pressure loss gradient dp/dt is smaller than this threshold value (y path), no further actions are necessary (S33). The suspicion that the brakes are hot ["hot brakes"] is consequently not confirmed. If the pressure loss gradient dp/dt is greater than the threshold value (n path), the extent of the further application of the automatic parking brake (S31) is determined in dependence upon the pressure loss gradients dp/dt and preferably in dependence upon the prevailing angle of inclination of the vehicle and the further application of the parking brake 1 is correspondingly carried out. Advantageously, the further application of the brake corresponds to the loss of clamping pressure.

Since the time constant of the cooling behavior of a brake system is known (generic to the determined value provided that the BTM is available) and also the loss of clamping force/loss of pressure within a defined time unit (dp/dt) is known, it is possible to conclude the total loss of clamping pressure that is to be expected. It is then decided in dependence upon the angle of inclination of the vehicle whether the expected loss of clamping force can be accepted or at which point in time a further application of the brake is necessary in order to securely hold the vehicle. The necessary further extent of the application of the automatic parking brake (in the case of the magnitude of the rigidity of the pincer arrangement being known) or rather the necessary further clamping force can also be estimated and can be provided for the further application of the automatic parking brake. Further actions are not necessary (S32).

In a further embodiment of the disclosure, the sequence of procedures is performed in an identical manner to the sequence of procedures of the method in accordance with the first embodiment of the disclosure. However, the difference is that the hydraulic pressure is built up at the front axle in step S24. Since the brake pistons of the front axle are not mechanically locked by means of a parking brake, it is possible in this case to work with much smaller forces (e.g. <30 bar). This leads to a further reduction of the loading on components since the procedure of controlling the valves can be performed with reduced currents.

It is not necessary in this case to control the electronic valves of the rear axle since the brake of the rear axle is already pre-stressed by means of the automatic parking brake 1. Virtually no additional volume is taken up. The danger of an incorrect interpretation (hot brakes, cold brakes) as a result of valve leakages is thus also minimized.

Figure 3:
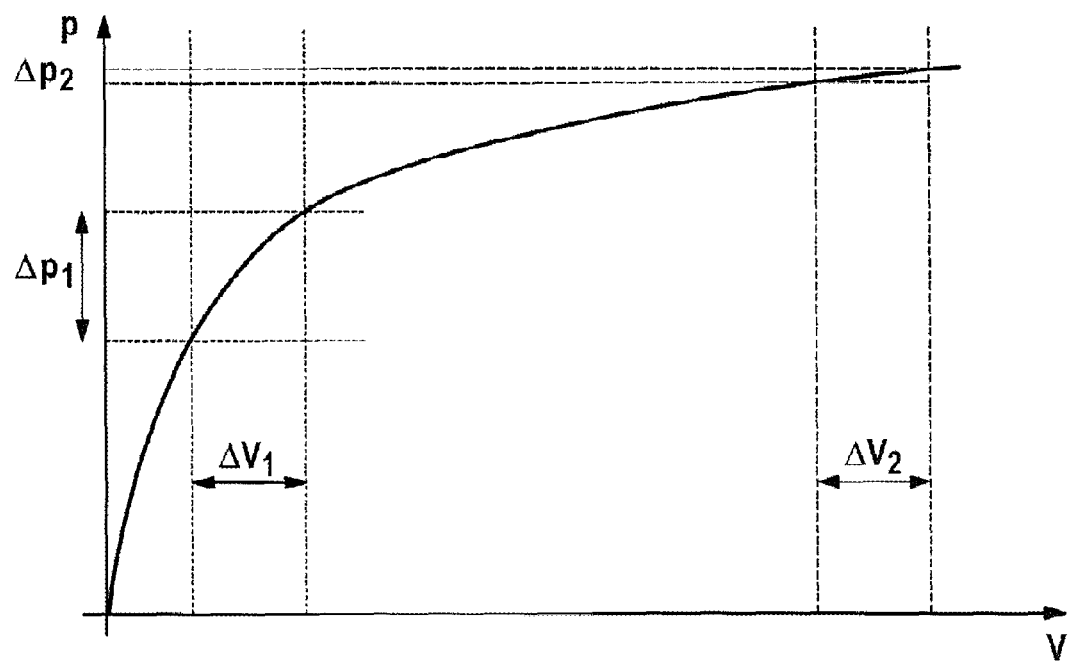
FIG. 3 illustrates a graph that illustrates a p (pressure)-V (Volume)-characteristic curve.

In addition, the change in pressure in the case of identical relaxation behavior is greater in the case of lower pressures since the rigidity of the pincer arrangement in this region is softer and as a result the measurement resolution is also finer. In accordance with the falling curve of the p-V characteristic curve in FIG. 3 and in particular the right-hand side (high forces/pressures), a defined change in volume/change in path $\Delta V2$ (e.g. caused by the brake disk 7 "shrinking" and the brake piston 5 moving forward accordingly) means only a small loss of pressure $\Delta p2$. In contrast, the same consideration in the case of a low pressure level and in the case of a defined change in volume/change in path $\Delta V1$ in the case of $\Delta V1=\Delta V2$ (see left-hand side of the characteristic curve in FIG. 3) leads to a clearly greater loss of pressure $\Delta p1$ ($\Delta p1>\Delta p2$) which is more expedient in relation to the measuring accuracy.

The probability of a leakage and an associated unintentional loss of pressure in the valves that are involved is clearly reduced in the case of lower pressures. In the case of the described system, a UPS (uninterrupted power supply) is provided. The electronic valves of the rear axle can be controlled but it is not necessary to control said valves.

Since both the braking force distribution between the front and rear axles of the vehicle and in addition the temperature correlation between the front and rear axles are known, it is possible by way of the behavior of the front axle to conclude the behavior (loss of clamping force) at the rear axle. In other words, by way of taking into account the pressure curve at the front axle, it is possible to conclude the force curve of a mechanical system at the rear axle.

The present disclosure can be used in connection with all current automatic parking brakes. In this case, the disclosure concerns in particular so-called "motor on caliper" parking brakes that have been described in connection with FIG. 1. The method can consequently be universally used and ensures in the case of different types of parking brakes that a clamping force is provided in a more reliable and purposeful manner, wherein the method can be integrated in a simple manner in the form of an algorithm into an open-loop or closed-loop control device and it consequently does not require any additional mechanical components. A corresponding pressure sensor technology is generally present in the braking circuit.

What is claimed is:

1. A method for providing a clamping force generated with an automatic parking brake of a vehicle using a brake motor and a brake piston that acts upon a brake disk, the method comprising:
    building up a hydraulic pressure in a braking circuit of the vehicle, separate from the automatic parking brake after a first application of the automatic parking brake;
    then calculating a pressure loss gradient in the braking circuit of the vehicle; and
    then performing a second separate application of the automatic parking brake based on the determined pressure loss gradient if the pressure loss gradient exceeds a predetermined threshold value.

2. A method for providing a clamping force generated with an automatic parking brake of a vehicle using a brake motor and a brake piston that acts upon a brake disk, the method comprising:
    building up a hydraulic pressure in a braking circuit of the vehicle, separate from the automatic parking brake after a first application of the automatic parking brake;
    then calculating a pressure loss gradient in the braking circuit of the vehicle;
    then performing a second separate application of the automatic parking brake based on the determined pressure loss gradient;
    then determining an expected total loss of clamping force at the automatic parking brake using the pressure loss gradient; and
    then compensating the expected total loss of clamping force with a third application of the automatic parking brake.

3. The method according to claim 1, wherein the determination of the pressure loss gradient further comprises:
    determining the pressure loss gradient at brakes of a rear axle of the vehicle.

4. The method according to claim 1, wherein the determination of the pressure loss gradient further comprises:
    determining the pressure loss gradient at brakes of a front axle of the vehicle in order to determine an expected total loss of the clamping force at a rear axle of the vehicle.

5. The method according to claim 1, further comprising:
    determining a prevailing angle of inclination of the vehicle; and
    performing a further application of the automatic parking brake based on the angle of inclination of the vehicle.

6. The method according to claim 1, further comprising:
    monitoring a loss of the clamping force at the automatic parking brake using a force measuring technology.

7. A system configured to generate a clamping force on a brake disk of a vehicle, the system comprising:
    an automatic parking brake separate from a braking circuit of the vehicle and including a brake motor and a brake piston that acts upon the brake disk; and
    a closed-loop device operable to:
        build up a hydraulic pressure in a braking circuit of the vehicle separate from the automatic parking brake after a first application of the automatic parking brake;
        then calculate a pressure loss gradient in the braking circuit of the vehicle; and
        then perform a second separate application of the automatic parking brake based on the determined pressure loss gradient if the pressure loss gradient exceeds a predetermined threshold value.

8. The system of claim 7, wherein the closed-loop device is included in the automatic parking brake for the vehicle.

9. A system configured to generate a clamping force on a brake disk of a vehicle, the system comprising:
- an automatic parking brake separate from a braking circuit of the vehicle and including a brake motor and a brake piston that acts upon the brake disk; and
- an open-loop device operable to:
    - build up a hydraulic pressure in a braking circuit of the vehicle separate from the automatic parking brake after a first application of the automatic parking brake;
    - then calculate a pressure loss gradient in the braking circuit of the vehicle; and
    - then perform a second separate application of the automatic parking brake based on the determined pressure loss gradient if the pressure loss gradient exceeds a predetermined threshold value.

10. The system of claim 9, wherein the open-loop device is included in the automatic parking brake for the vehicle.

* * * * *

UNITED STATES PATENT AND TRADEMARK OFFICE
CERTIFICATE OF CORRECTION

PATENT NO. : 9,937,907 B2  
APPLICATION NO. : 14/615549  
DATED : April 10, 2018  
INVENTOR(S) : Blattert et al.

Page 1 of 1

It is certified that error appears in the above-identified patent and that said Letters Patent is hereby corrected as shown below:

On the Title Page

Item (54), and in the Specification, Column 1 Lines 1-4 the title should read:
"METHOD FOR PROVIDING A CLAMPING FORCE THAT IS GENERATED BY MEANS OF AN AUTOMATIC PARKING BRAKE FOR A VEHICLE"

Item (72), Inventor #1, Dieter Blattert's residence should read:
"Kirchheim/Neckar (DE)"

Signed and Sealed this  
Seventh Day of August, 2018

Andrei Iancu  
*Director of the United States Patent and Trademark Office*